UNITED STATES PATENT OFFICE.

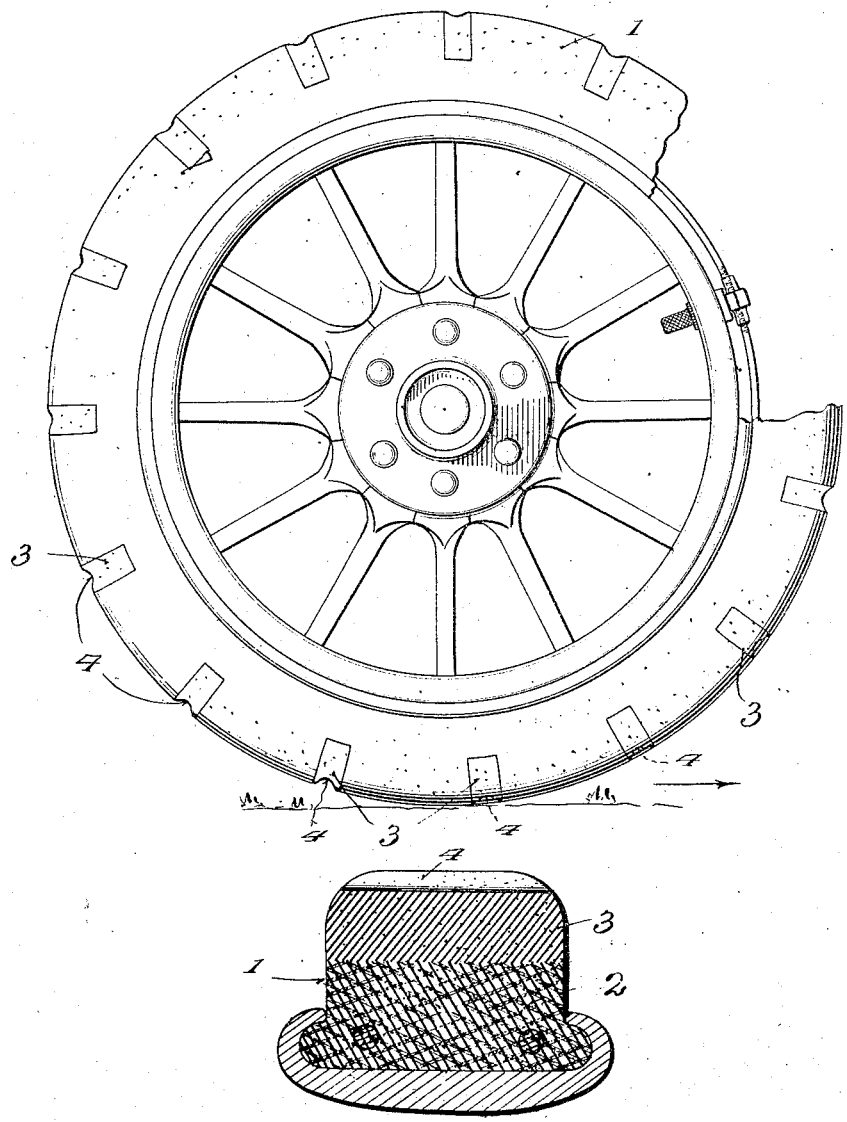

LOUIS M. NELSON, OF PENNINGTON, NEW JERSEY, ASSIGNOR TO NELSON TIRE COMPANY, A CORPORATION OF WYOMING.

TIRE.

955,188. Specification of Letters Patent. Patented Apr. 19, 1910.

Application filed November 2, 1909. Serial No. 525,912.

To all whom it may concern:

Be it known that I, LOUIS M. NELSON, citizen of the United States, residing at Pennington, in the county of Mercer and State of New Jersey, have invented certain new and useful Improvements in Tires, of which the following is a specification.

This invention comprehends certain new and useful improvements in tires, for the wheels of automobiles, automobile trucks or other vehicles, and relates particularly to a tire of the cushion type.

As heretofore ordinarily constructed, cushion tires are of two well defined forms, namely, the continuous tire which extends entirely around the wheel felly or rim, and the block tire which consists of a plurality of sections or rubber blocks with spaces between. The first of these forms is open to the serious objection that when the tire is in service, a wave is produced on the tread of the tire which tends to deteriorate the tire as well as to interfere with the ease of running the vehicle due to the excessive road friction. The second of these forms, namely the block tire, has the advantage of eliminating the effect of the wave and the road friction, in view of the fact that the wave runs out at the end of each block, and hence such tires run more easily than the endless tire; but a serious disadvantage incidental to the block tire is that it causes an excessive vibration on the machine, as is manifest.

With a knowledge of these conditions, it is the primary aim of my present invention to combine the advantageous features of both of these forms of cushion tires without their accompanying disadvantages, and to this end, the invention consists essentially in a tire the main body of which is composed of a substance or material, or combination of the same which will produce the requisite resiliency, and which is interrupted at predetermined intervals with very soft pieces of rubber which are "cured" with the main body portion so as to produce a practically continuous tire, with each soft portion slightly cut away at the tread, so that when the wave of the tread strikes the soft portion of the tire the wave will be absorbed and the rubber may compress, to fill out the hollow or cut away portion, but without forcing the soft rubber out beyond the main circular tread surface of the tire. And the invention also consists in certain constructions, and arrangements of the parts that I shall hereinafter fully describe and claim.

For a full understanding of the invention, reference is to be had to the following description and accompanying drawings in which:

Figure 1 is a side elevation of a tire formed in accordance with my invention, parts thereof being broken away; and Fig. 2 is a transverse sectional view thereof, the section being taken through one of the relatively soft rubber blocks.

Corresponding and like parts are referred to in the following description and indicated in all the views of the accompanying drawings by the same reference characters.

In carrying out my invention, the main body 1 of my improved tire is composed of any desired resilient substance or substances or combination of the same, and is preferably composed of textile fabric, such as cotton duck, the fibers of which are impregnated with rubber and of a hard nature to give the proper resiliency to the tire. The main body portion of the tire is interrupted preferably at regular intervals at any desired distances apart, with relatively soft pieces of rubber 3, as clearly illustrated in the drawing, the same preferably terminating short of the rim edge of the body portion, and being preferably of considerably less thickness or circumferential extent than the relatively hard portions between them. The whole structure, to wit, the body portion 1 and the relatively soft portions 3 are cured into a continuous tire with each soft portion cut away or provided with a slight depression at the tread as indicated at 4, so that when the wave of the tread strikes the soft portion of the tire the wave will be absorbed and the rubber may compress without forcing the soft block 3 out beyond the tread surface of the tire.

From the foregoing description in connection with the accompanying drawing, it will be apparent that I have provided a very simple and durable cushion tire which, in the use of the soft blocks 3 in the tread of the tire in combination with the relatively hard, although resilient main body portion, will possess the capability of effectually absorbing the tread wave and of relieving the road friction, and without the use of the blocks that are entirely independent from each other, and which, as has been before stated are open to the serious objection of producing an excessive strain on the vehicle.

It is to be understood, that any form of fastening may be employed in connection with my improved tire; that it may be of any desired size, cross section, shape and design, according to the particular wheel and wheel rim for which it is intended, and that the invention is not limited to the exact construction, arrangement and proportion of parts shown and described herein, as various changes and modifications may be made without departing from the scope of the invention as defined in the appended claims.

Having thus described the invention, what is claimed as new is:

1. A tire comprising a resilient body portion, the tread surface of which is interrupted at intervals with relatively soft portions the latter terminating in their uncompressed condition short of the remaining tread surface whereby to form tread depressions.

2. A tire comprising a resilient body portion, the tread surface of which is interrupted at intervals with relatively soft rubber blocks, said blocks being formed in their uncompressed condition with tread depressions for the purpose specified.

3. A tire, comprising a body portion composed of fabric impregnated with rubber and the tread surface of which is interrupted at intervals with relatively small soft rubber blocks terminating short of the rim edge of the body.

4. A tire, comprising a body composed of a textile fabric impregnated with rubber, the tread surface of said body being interrupted at intervals with soft rubber blocks terminating short of the rim edge of the body and formed in their uncompressed condition with tread depressions.

In testimony whereof I affix my signature in presence of two witnesses.

LOUIS M. NELSON. [L. S.]

Witnesses:
FRANK LE BAR,
WM. M. RADCLIFFE.